A. H. PETERSON.
Water-Filter.

No. 222,731. Patented Dec. 16, 1879.

Witnesses
William J. Cooper
Harry Smith

Inventor
Albert H. Peterson
by his Attorneys
Howson and Son

UNITED STATES PATENT OFFICE.

ALBERT H. PETERSON, OF PHILADELPHIA, PENNSYLVANIA.

IMPROVEMENT IN WATER-FILTERS.

Specification forming part of Letters Patent No. 222,731, dated December 16, 1879; application filed May 23, 1879.

*To all whom it may concern:*

Be it known that I, ALBERT H. PETERSON, of Philadelphia, Pennsylvania, have invented a new and useful Improvement in Water-Filters, of which the following is a specification.

The object of my invention is to so construct a water-filter as to insure thorough filtration and provide for the ready cleansing of the filtering material without taking the filter apart.

This object I attain in the manner which I will now proceed to describe, reference being had to the accompanying drawings, in which—

Figure 1:
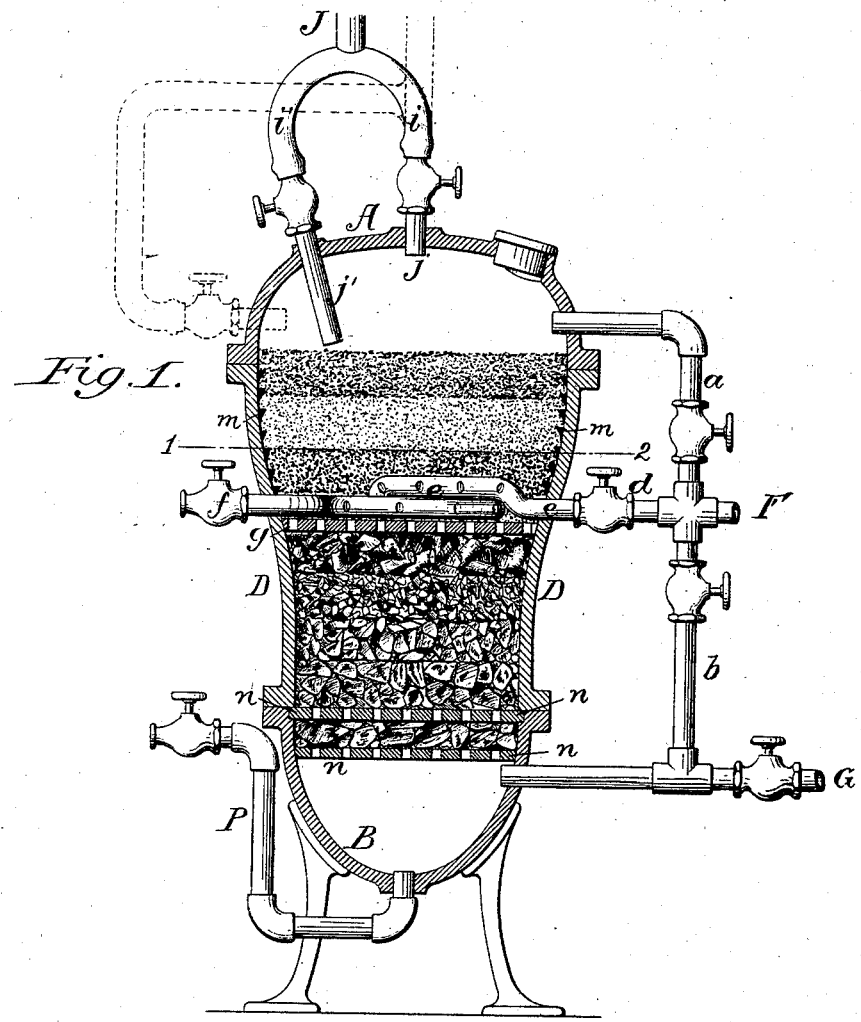
Figure 2:
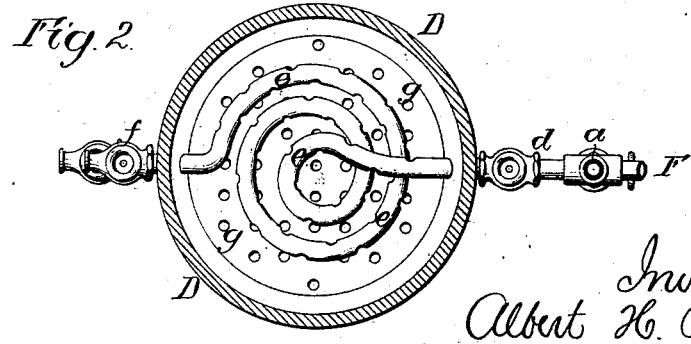

Figure 1 is a vertical section of my improved filter, and Fig. 2 a sectional plan on the line 1 2.

The body of the filter is made in three parts—namely, the concavo-convex top A and bottom B and the intermediate section, D, which is of larger diameter at the top than at the bottom, the increase in diameter being gradual, so as to impart to the said section D the shape shown in Fig. 1. The sections are provided with suitable flanges by which they may be bolted together.

F is the inlet-pipe, which has two vertical branches, $a$ and $b$, both provided with suitable stop-valves, the pipe $a$ communicating with the space above the filtering medium, and the pipe $b$ with the space below the same. There is a third branch, $d$, also provided with a valve, this branch communicating with a perforated pipe, $e$, coiled within the filter, and having a valved outlet, $f$, the pipe, by preference, resting upon a perforated partition, $g$. The branch $b$ communicates with a discharge-pipe, G, having a valve by which the flow of water through the same may be regulated or cut off.

J is another delivery-pipe, which has two branches, $i\ i'$, which communicate with valved pipes $j\ j'$, both of the latter projecting through the cover or top A of the filter, the pipe $j$, however, projecting but slightly into the interior of the filter, while the pipe $j'$ projects almost to the surface of the filtering medium. The pipe J may communicate with a wash-pave or other point of discharge where filtered water is not necessary.

When the filter is in operation the valves in the pipes $b$, $d$, $j$, and $j'$ are closed and the valves in the pipes $a$ and G open. Water from the pipe F passes up through the pipe $a$ and enters the interior of the filter at a point above the filtering medium in the same, down through which it passes, so that by the time it reaches the lower portion of the filter and passes out through the pipe G it will be thoroughly filtered.

When it is desired to clean the filter the valves in the pipes $a$ and G are closed, and those in the pipes $b$ and $j$ opened. The water now passes through the pipe $b$ into the lower end of the filter, and rises through the mass of filtering material in the same, and finally passes off through the pipes $j$ and J to the wash-pave, carrying with it the impurities which it has collected in its passage through the mass of filtering material.

If the upper portion of the mass is tightly packed the valve in the pipe $d$ may be opened, so that a number of forcible jets of water will be directed from the perforations in the pipe $e$ into and through said mass, the effect of these jets being to loosen the mass so as to permit the ready passage through the same of the less-forcible volume of water. By means of the pipe $e$ the upper portion of the mass of filtering material may be cleansed without disturbing the lower portion.

If the pipe $e$ becomes clogged with sand it may be readily cleared by opening the valve $f$, so as to permit the water to flow through the pipe for a short time.

It will be observed that the finest portion of the filtering material is at the top of the filter, where the water enters the same when the filter is in operation. The object of this is to collect the greater portion of the impurities upon the surface of the mass of filtering material. This collection of impurities is removed at intervals by opening the valve in the pipe $j'$, the other valves remaining the same as when the filter is in operation. As soon as the valve in the pipe $j'$ is opened a current across the surface of the filtering material is created by the stream of water flowing from the mouth of the pipe $a$ to the mouth of the pipe $j'$. This current has sufficient force to stir up and carry off the impurities, which pass off through the pipe J, leaving the surface of the filtering material clean.

The object of gradually enlarging the diameter of the section D of the filter at the upper end is to prevent the channeling which is apt to take place in a cylindrical filter, and in order to further prevent such channeling the section D may be provided with internal ribs, $m$. Any sediment which collects in the bottom of the filter may be drawn off from time to time through a pipe, P.

Near the bottom of the filter, but above the mouth of the pipe $b$, are two screens, $n$ $n$, the space between which is filled with broken stone or other filtering material.

The pipe $j'$, instead of projecting through the top of the cover A, may project through one side of the same, and may be connected to the pipe $j$, as shown by dotted lines in Fig. 1, in which case the pipe J and its branches may be dispensed with. A man-hole is formed in the cover A, so as to permit access to the interior of the filter, this man-hole being closed when the filter is in use by means of a suitable cap or cover.

I claim as my invention—

1. The combination of the filter, the supply-pipe F, having a valved branch, $a$, communicating with the top of the filter, and a valved branch, $b$, communicating with the bottom of the same, the valved discharge-pipe $j$ at the top, and the valved discharge-pipe G at the bottom, whereby a direct flow of water in either direction may be maintained, all substantially as set forth.

2. The combination of the filter with the perforated distributor $e$, embedded in the filtering material, and receiving its supply of water independently of the supply-pipes $a$ and $b$, whereby it is adapted for cleansing the filtering material, all substantially as specified.

3. The combination of the filter with the perforated pipe $e$, having a valved outlet, $f$, as specified.

4. The combination of the casing of the filter, in which the filtering material is arranged so as to leave a space above the same, with the inlet-pipe $a$ and the outlet-pipe $j'$, the mouths of which communicate with the said space close to the surface of the filtering material, so as to induce a cleansing current across the same, as specified.

In testimony whereof I have signed my name to this specification in the presence of two subscribing witnesses.

ALBERT H. PETERSON.

Witnesses:
WILLIAM J. COOPER,
HARRY SMITH.